Nov. 16, 1937.   L. R. KALMBACH   2,099,116
CLAMP
Filed May 7, 1936

INVENTOR
L. R. KALMBACH
BY E. R. Nowlan
ATTORNEY

Patented Nov. 16, 1937

2,099,116

UNITED STATES PATENT OFFICE 2,099,116

CLAMP

Lloyd R. Kalmbach, West Englewood, N. J., assignor to Western Electric Company, Incorporated, New York, N. Y., a corporation of New York Application May 7, 1936, Serial No. 78,413

2 Claims. (Cl. 294—67)

This invention relates to a clamp and more particularly to a clamp or adjustable hook for used in hoisting heavy or bulky articles.

In the installation of telephone central office equipment and apparatus, it is customary in some instances to assemble a unitary group of correlated devices and pieces of apparatus in what are termed "crossbar frames". These are simply skeleton frames or cages built of metallic channel and angle members secured together. Such a frame with the apparatus in place therein then presents itself as a bulky unit of considerable length and height but relatively small in depth, and of considerable weight. Being filled with delicate apparatus it is not advisable to maneuver bulky and heavy clamps or hooks inside the interior of the frame.

One object of the present invention is to provide a clamp or hook which may be securely, although temporarily, attached to an object of great weight and bulk such as a crossbar frame, without invading the interior thereof to any appreciable extent.

The invention contemplates, in one embodiment thereof, a bolt having an overhanging elongated head adapted to be passed through a correspondingly shaped slot in a member of an object and to be turned to overhang the sides of the slot thereby leaving a portion of the slot vacant and uncovered, the stem of the bolt occupying a portion only of the slot, in combination with a link member broader than the slot, mounted on the stem of the bolt and having a projecting lug adapted to enter the vacant portion of the slot, the member of the object being then clamped between the head of the bolt and the link member by tightening the nut of the bolt, and the bolt being held against rotation by abutting against the adjacent lug of the link.

Other objects and features of the invention will appear from the following detailed description of one embodiment thereof taken in connection with the accompanying drawing in which like reference numerals are applied to identical parts in the several figures and in which Fig. 1 is a broken view in side elevation and partly in section of a clamp constructed in accordance with the invention in process of application to an object;

In describing the invention as herein disclosed, it will be assumed that a heavy and bulky object such as a telephone central crossbar frame has as one of its components a shallow channel member 20 comprising a flat web 21 with integral upturned lateral flanges 22 and 23, and that the web 21 of the channel is formed at some convenient point with a slot 24, preferably of generally rectangular shape and longer than wide.

A clamp or hook is designed in accordance with the invention to be secured to the member 20 without passing beyond the web 21 by more than the depth of the flanges 22 and 23, or substantially more than a distance equivalent to the thickness of the web 21 in the illustrative case. This clamp comprises two principal elements:— a bolt generally indicated at 30 and a link generally indicated at 40.

Figure 1:
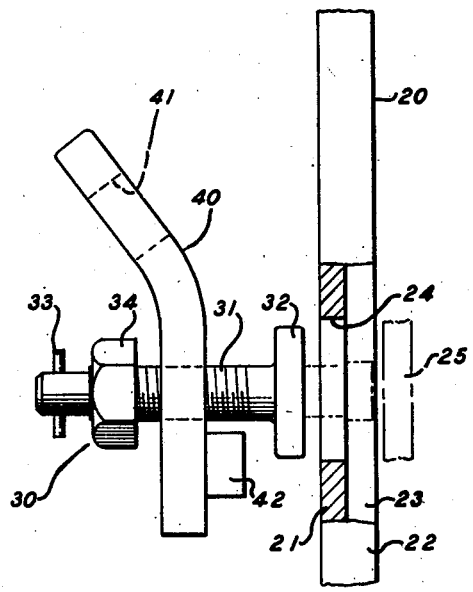
Figure 2:
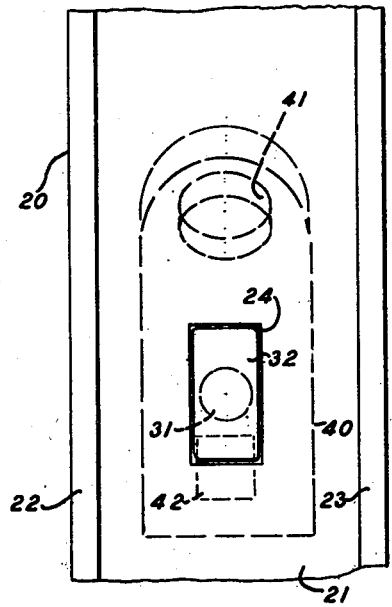
Fig. 2 is a view thereof in rear elevation.
Figure 3:
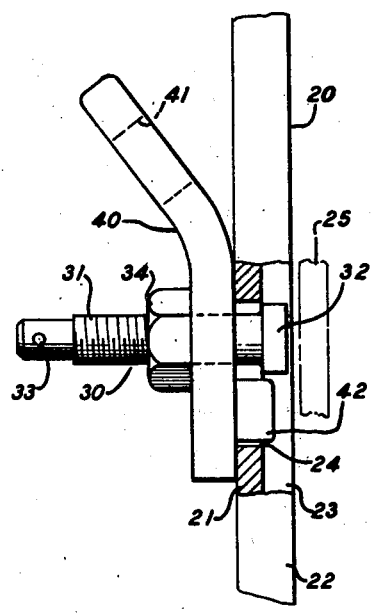
Fig. 3 is a view similar to Fig. 1 with the clamp in place.
Figure 4:
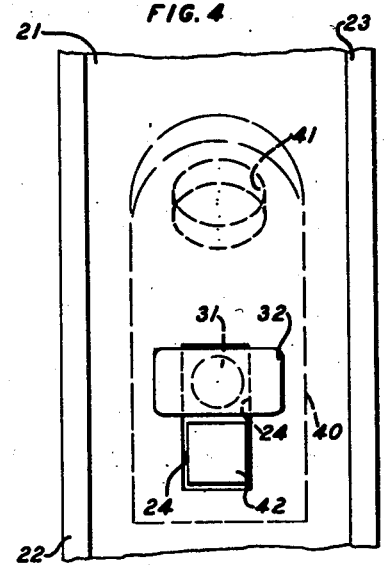
Fig. 4 is a view thereof in rear elevation.

The bolt 30 is formed with a threaded shank or stem 31 having at one end an overhanging head 32 and at the other end a transversely extending pin 33 permanently mounted in a corresponding bore in the shank 31. A nut 34 of any suitable conventional form, here shown as an ordinary hexagonal nut, is located on the threaded part of the shank 31 and is threaded internally to coact therewith. This nut 34 may in some instances advantageously be a wing nut. The head 32 of the bolt has a rectangular contour of proportions to permit it to pass easily through the aperture 24 as indicated in Figs. 1 and 2 and then when turned a quarter turn as indicated in Figs. 3 and 4 to overlap the sides of the aperture 24. The pin 33 is not necessary but is provided to afford convenient means for turning the bolt after passing its head through the aperture. The bolt having been thus entered into the slot 24 is turned as described and slid bodily upwardly so that the shank of the bolt occupies the upper portion of the slot leaving the lower half of the slot free and vacant so far as the bolt is concerned.

The link 40 is, generally, a flat strap bent more or less at its middle to carry its upper end away from the channel 20 when secured thereto and perforated as at 41 near its upper end to receive an ordinary hoisting hook or other attaching device. The link is perforated also in its lower portion to be slidably mounted, as shown, on the shank of the bolt 30. Below this latter perforation the link is formed with an integral lug 42 proportioned to substantially fill the lower part of the slot 24 when inserted thereinto as shown in Figs. 3 and 4 and to extend substantially flush with the head 32.

When the link and bolt have been positioned and the nut 34 tightened as shown in Figs. 3 and 4, the three elements 20, 30 and 40 are securely and relatively immovably fastened together. The link 40 and web 21 are clamped between the nut 34 and the head 32. The bolt shank 31 cannot slide down in the slot 24 to any extent because the lug 42 will be stopped by the bottom edge of the slot, nor up because the shank will be stopped by the top edge of the slot. The bolt can rotate only trivially before its head will strike against and be stopped by the lug 42. And the link can rotate only trivially on the bolt before the lug strikes the sides of the slot.

The device 30, 40 can only be released from the member 20 by backing the nut 34 along the shank 31 far enough to permit the link to be moved to withdraw the lug from the slot. Then the bolt can be turned to match the head 32 to the slot to be withdrawn therethrough.

During all the operations of attaching and detaching the device 30, 40 to and from the member 20, the space within the member 20 need never be invaded by substantially more than the thickness of the head 32; so that even if the open inner side of the channel were covered by some member 25 indicated in dotted lines in Figs. 1 and 3, the device 30, 40 could still be attached to the member 20 provided the distance between 21 and 25 were triflingly greater than the thickness of the head, and provided the depth of the lug 42 were less than the sum of the thicknesses of the web 21 and head 32.

Evidently the slot 24 might also be wider than high, if the lug 42 be positioned to stand beside the shank 31 instead of underneath. Also if the slot 24 be as shown, the lug 42 might be above the shank 31. Also, clearly, the slot 24 need not be rectangular but may have any desired contour, e. g. elliptical, so only that it be elongated, the contours of the head 32 and lug 42 being conformed to that of the slot.

Other modifications will readily suggest themselves, the embodiment shown being merely illustrative and the invention being limited only in scope and spirit by the appended claims.

What is claimed is:

1. A detachable support for clamping attachment to an object having an elongated slot, the said support comprising a member having an elongated overhanging head formed to pass through the slot from one side of the object when in one position relative to the slot and not when rotated into another position, a support member movably mounted on the body of the first member and provided with a lug formed to enter the slot from the same side of the object only beside the body of the first member and to stand beside the head of the first member when in the second position of the head to prevent the first member from rotating from its second position and to prevent the support member from rotating, means formed integrally on the support member whereby the same and therewith both the first member and the object may be supported, and adjustable means to force the support member to move on the first member toward the head of the first member to clamp the object between the head and the support member.

2. A detachable support for clamping attachment to an object having an elongated slot, the said support comprising a bolt having a transversely elongated and overhanging head formed to pass through the slot from one side of the object when in one position relative to the slot and not when rotated into another position, a combined supporting and clamping member slidably mounted on the body of the bolt and provided with a lug formed to enter the slot from the same side of the object only beside the body of the bolt and to stand beside the head of the bolt when the head is in the second position of the head to prevent the bolt from rotating from its second position and to prevent the member from rotating, a second lug formed on the member to stand spaced apart from the object when the member is in contact therewith and formed with means whereby the member and therewith both the bolt and the object may be supported, and a nut on the bolt to force the member to slide on the bolt toward the head of the bolt to clamp the object between the head of the bolt and the member.

LLOYD R. KALMBACH.